Sept. 18, 1928. 1,684,935
D. G. ZALOCOSTAS
PROCESS FOR EXTRACTION OF SALTS FROM AQUEOUS SOLUTIONS
Filed March 28, 1925 3 Sheets-Sheet 3
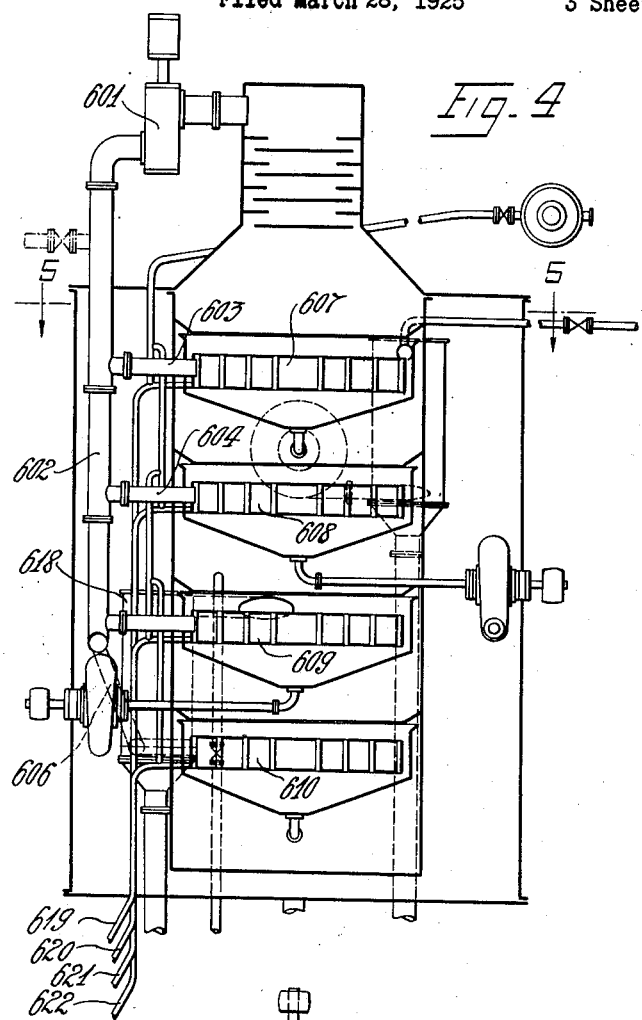
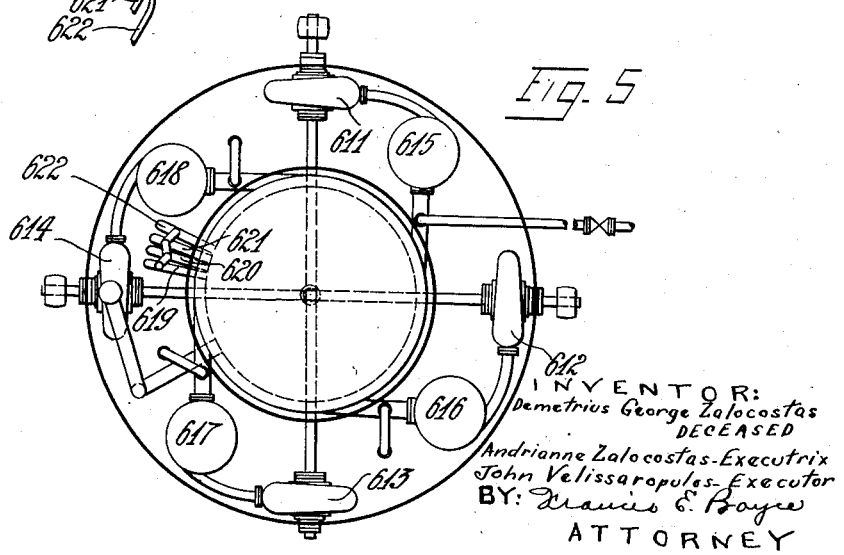
INVENTOR:
Demetrius George Zalocostas
DECEASED
Andrianne Zalocostas-Executrix
John Velissaropulos-Executor
BY: Francis E. Boyce
ATTORNEY Patented Sept. 18, 1928.

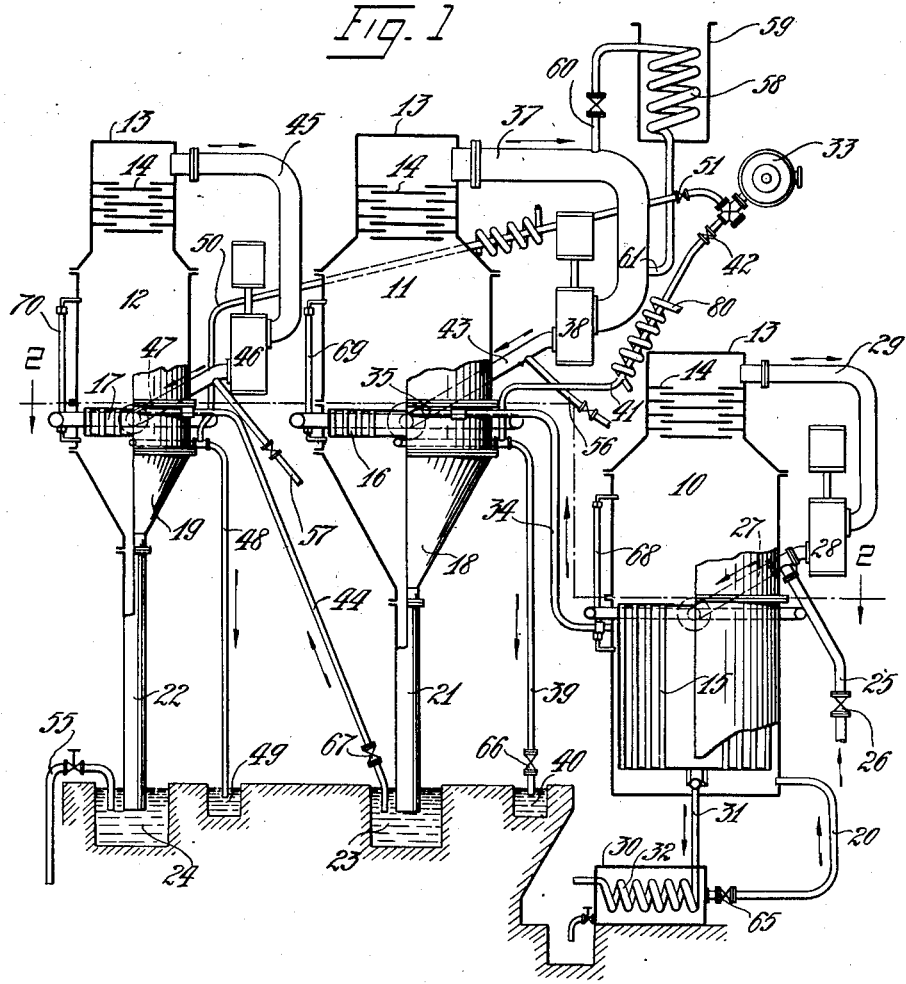

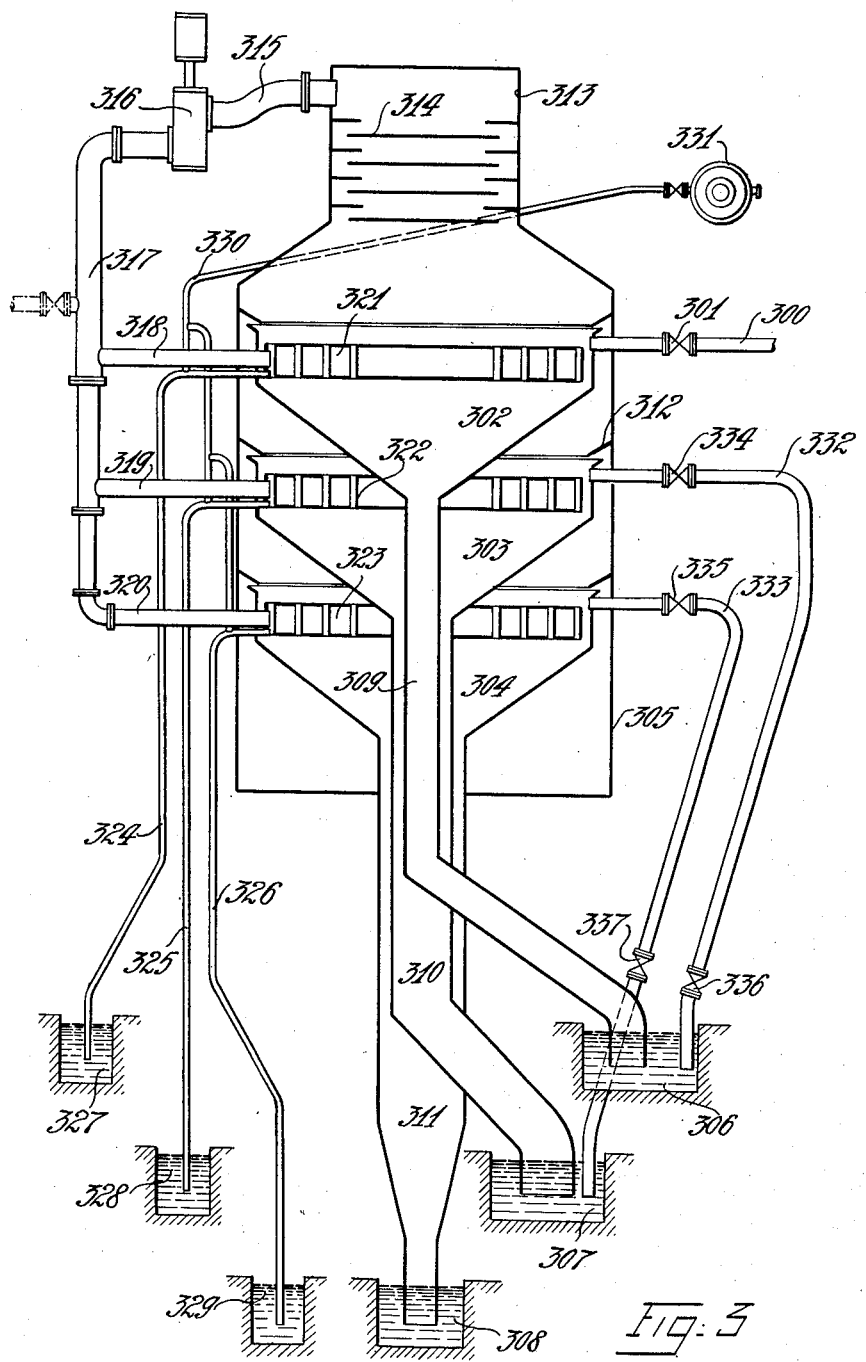

1,684,935

UNITED STATES PATENT OFFICE.

DEMETRIUS GEORGE ZALOCOSTAS, DECEASED, LATE OF BONDI, NEAR SYDNEY, NEW SOUTH WALES, AUSTRALIA, BY ANDRIANNE ZALOCOSTAS, EXECUTRIX, OF BONDI, NEAR SYDNEY, AND JOHN VELISSAROPULOS, EXECUTOR, OF BELLEVUE HILL, NEAR SYDNEY, AUSTRALIA, ASSIGNORS TO THE SALT PRODUCTION SYNDICATE LIMITED, OF SYDNEY, NEW SOUTH WALES, AUSTRALIA, AN INCORPORATED COMPANY OF NEW SOUTH WALES.

PROCESS FOR EXTRACTION OF SALTS FROM AQUEOUS SOLUTIONS.

Application filed March 28, 1925, Serial No. 19,009, and in Australia April 10, 1924.

This invention relates primarily to the extraction of sodium chloride in a substantially pure condition from sea water and to apparatus for effecting its extraction therefrom; but the process and apparatus are otherwise usable for the obtaining of salts from aqueous solutions and for the evaporation of liquids.

In the extraction of salts from sea water, as in the extraction of salts from other aqueous solutions, operating difficulties are frequently encountered consequent upon the precipitation of certain salts on the heating surfaces, which are thus "scaled", so that periodical chipping and cleaning up of the apparatus is necessary The presence of scale diminishes the economical operation of the apparatus. Calcium sulphate, which is present in notable quantities in sea water, is found to precipitate on heating surfaces in evaporators, and one of the objects of the present invention is to effect the removal of the calcium sulphate during the evaporation of the water in such a way that it will be precipitated as a mud which may be readily removed and will not be deposited as scale on the heating surfaces. With this object in view evaporation is conducted in the stage of concentration in which calcium sulphate is precipitated, below a critical temperature, which is about 38° C. or a little higher. Above that critical temperature the solubility of calcium sulphate decreases progressively; consequently when evaporation is conducted at any temperature above this critical point the solubility of the calcium sulphate is brought past precipitation point at the heating surfaces, where the temperature is higher than elsewhere in the evaporator. Contrariwise, when evaporation is conducted at any temperature below the critical temperature the solubility of the calcium sulphate is a maximum at the heating surfaces where the temperature is higher than elsewhere in the evaporator and progressively diminishes therefrom throughout the body of the liquid. Consequently, when the temperature is below the critical point, precipitation takes place not at the heater surfaces but in the body of the liquid distant from the heater surfaces and the precipitated salt thus released in the solution falls by gravity to a sump whence it may be removed. In the case of sea water, evaporation is conducted in three stages. In the first stage, the volume of the liquid is reduced to about one-third, at which concentration the brine is near the saturation point of calcium sulphate. The calcium sulphate is precipitated in the next stage of the evaporation. In the first stage of evaporation, high temperature is used in the calandria, with the object of augmenting thermal economy. In the second stage, evaporation is conducted in a heated chamber, at a relatively low temperature (about 38° C.), until all or substantially all of the calcium sulphate has been precipitated as a mud. In the final stage, evaporation is conducted at a temperature either above or below the same critical point for the precipitation of the sodium chloride. The residual bitterns may be subjected to further treatment for the recovery of salts contained in them.

It would be practicable to obtain in a large measure the advantage of the process by adding sufficient sodium chloride to the liquor when its volume has been reduced to a little below one-third of the original volume so as to saturate it with sodium chloride and thereby reduce its capacity for holding calcium sulphate. Precipitation of a portion of the calcium sulphate would thus be caused and in the succeeding stage of evaporation scaling would be minimized, as most of the remaining calcium sulphate would be carried down by the sodium chloride.

The known "vapor recompression" system is utilized for reasons of thermal economy, the vapors given off from the concentrating solutions being recompressed so as to reheat them sufficiently to enable them to be utilized again in the calandria with the augmented economy which results from operation with recompression.

In order to minimize the temperature difference necessary for procuring transference of heat from the calandria to the evaporating liquid, the height of the calandria is limited in the low temperature stage and optionally also in earlier stages of the evaporation.

In any evaporator there is a hydrostatic condition which causes the liquid in contact with the lower part of the calandria to boil only at a higher temperature than that at which the liquid in contact with the top of it stands. It is therefore necessary to provide such a temperature difference between the steam in the calandria and the evaporating water in which the calandria is immersed that the steam temperature will be adequate to effect transference of heat through the lower part of the calandria. The temperature in the upper part of the calandria is thus made unnecessarily high. Otherwise more or less of the calandria surface will be inoperative for procuring vaporization. If, however, the calandria be made very shallow the temperature difference as between its upper and lower surfaces will be negligible or almost so. This condition is more marked in low temperature ranges than in higher temperature ranges. In a relatively low temperature range, a relatively small steam pressure difference corresponds with a given steam temperature difference in the calandria, whereas in the high temperature range a much higher steam pressure difference is necessary to procure a like difference in steam temperature in the calandria. If for instance water is evaporating under partial vacuum at 211° F., measured at its surface, a temperature of 212° F.—a rise of 1° F. only—would be required to evaporate water at a depth of 8 inches below the surface. But if the evaporation is being carried out under higher vacuum, at a temperature of 111° F. at the surface, then a 1° F. rise of temperature to 112° F. would be necessary to cause vaporization to take place at one-tenth of an inch (approximately) below the surface. At 8 inches below the surface (ebullition at surface at 111° F.) the temperature necessary would be about 118° F.— a difference of 7° F. It is important therefore in order to operate at the lower practicable temperatures in low vacuum conditions that the calandria surfaces should be disposed as near surface level as practicable in the evaporating liquid, and not immersed over a considerable depth in the liquid. A certain depth of immersion is unavoidable, but it is designedly kept at a working minimum.

Better economy is obtainable accordingly by operating with a plurality of separate shallow pans each fitted with its own calandria, with the heat transmission surfaces of the several calandria disposed near the liquor levels, than by operating an evaporator which is fitted with only one calandria having a depth corresponding with the sum of the depths of such several calandria. It would be impracticable for obvious reasons to multiply the number of evaporators in order to gain this advantage, but it is not necessary to do so, as the arrangement of a plurality of pans and calandria in one evaporator is practicable, so as to procure vaporization under identical conditions in all these pans simultaneously.

In the accompanying drawings:—

Fig. 1 is a semi-diagrammatic sectional elevation of an evaporator plant for the extraction of salts from sea water;

Fig. 2 is a corresponding top plan;

Fig. 3 is a diagrammatic vertical section through an evaporator containing three calandria in tier arrangement with tubular precipitation legs from the respective pans brought down through the bottom of the evaporator in concentric arrangement;

Fig. 4 is a diagrammatic vertical section through an evaporator within a jacket chamber in which all the co-acting apparatus is enclosed; and Fig. 5 is a corresponding horizontal section on the line 5—5 Fig. 6.

Referring to Fig. 1;

10, 11 and 12 are evaporators, each of them formed with a vapor head 13 fitted with baffle plates 14 to catch and return entrained liquid particles. 15, 16 and 17 are calandrias which are fitted in the lower portion of each of the evaporators 10, 11 and 12 respectively. The evaporators 11 and 12 are formed with hopper bottoms 18 and 19 respectively; these bottoms terminate in tubular legs 21 and 22, the bottom ends of which dip respectively into brine contained in open top precipitate sumps 23 and 24, both disposed at the same hydrostatic level. 25 is a steam supply pipe, and 26 a control valve therein; this pipe is junctioned into the supply pipe 27 leading to the interior of the calandria 15. Through the pipe 25 steam is introduced during operation to make up heat losses in the system and to bring sea water contained in the evaporator 10 to boiling point. The pipe 27 is branched to the compression cylinder of a vapor recompression pump 28, which may be a pump of the reciprocating type or of the rotary type. Vapor produced by boiling of the sea water which is fed into the evaporator 10 passes over by the pipe 29 to the pump 28 and is raised in temperature by recompression to the desired point for effecting heat transmission through the calandria to procure evaporation of further quantities of water in the evaporator 10.

The feed of sea water is introduced through the feed water heater 30. Drainage of condensed hot water from the calandria 15 passes downward by gravity through the tail pipe 31 into the heater coil 32 of the feed water heater 30. Inflow of this preheated sea water from the heater 30 passes into the bottom of the evaporator 10 through the feed pipe 20.

Partially concentrated hot saline liquid is drawn from the mid portion of the primary evaporator 10 near the surface of the liquid therein through the pipe 34 into the second stage evaporator 11 near the surface level (35) of the brine therein which submerges the calandria 16; this level is maintained approximately constant by reason of the vacuous condition existing in the evaporator 11 which is regulated by manipulating the valve 42 in the suction pipe 41 of the air pump 33. The lifting value of this vacuum is proportioned to the hydrostatic height between the surface of the liquid in the evaporator 11 and the surface of the liquid in the precipitate sump 23, which liquid is in communication with the liquid in the evaporator 11 through the depending tubular leg 21 of the evaporator 11. The head of the evaporator 11 is connected through the eduction pipe 37 to the vapor recompression pump 38 in which the educted vapor from the evaporator 11 is recompressed to raise its temperature, and then sent to the calandria 16. The condensate from the calandria 16 is taken off by the drip pipe 39, the foot of this drip pipe being dipped into the sump 40. This sump is disposed at the appropriate hydrostatic level, which is not necessarily the same level as the precipitate sump 23. 65, 66 and 67 are check valves which are set to allow upward flow only. 68, 69 and 70 are gauge glasses on the several evaporators 10, 11 and 12, by means of which the liquid levels therein may be observed during operation. 41 is a suction pipe branched from the pipe 39 and led through a regulator valve 42 to the air pump 33. Inasmuch as the pump 33 is thus put in communication through the pipes 41 and 39, the calandria 16, pipe 43, pump 38, and pipe 37 with the evaporator 11, a uniform vacuous state is maintained in the evaporator 11, from which it results that the brine level in that evaporator will always remain constantly balanced against the hydrostatic head above the surface of the liquid in the sump 23, and therefore at constant level, just submerging the calandria 16. The pump 38 maintains a difference of pressure between the sump 23 and the calandria 16 equivalent to the degree of temperature difference of the steam required for effecting heat transference. The third stage evaporator 12 is charged with brine from the sump 23, said brine being sucked up through the lift pipe 44 into the evaporator 12, consequent on the vacuous condition which is maintained within that evaporator by the like means. As in the case of the evaporator 11, a similar arrangement is used for recompressing the vapor given off, 45 being an eduction pipe, 46 a recompression pump, and 47 a delivery pipe into the calandria 17. 48 is a condensate drip-pipe from the calandria 17, having its bottom end immersed in the liquor in the sump 49. The drip pipe 48 is connected by a pipe 50 and valve 51 to the air pump 33.

58 is a vapor cooling coil contained in a water tank 59, and arranged as a shunt in the vapor eduction pipe 37. It takes vapor from the second stage evaporator 11 through a valved pipe 60, and delivers condensed hot water through the pipe 61 to the recompression pump 38. 80 is a cooling coil surrounding the air pump intake pipe 41 from the second stage evaporator 11, and 81 is a cooling coil surrounding the air pump intake pipe 50 from the third stage evaporator 12. The function of the coils 80 and 81 is to effect condensation of vapor in the pipes 41 and 50 when it is found necessary to relieve the air pump 33 of overload.

The air pump 33 through its two connections 41 and 50 functions normally to maintain an equally balanced vacuous condition in the second and third stage evaporators 11 and 12, but by manipulating the valves 42 and 51 the control may be varied so that a difference in the vacuous condition in these vessels respectively may be procured.

The saline liquors are transferred from evaporator to evaporator in sequence either by pumping or gravitationally, in the latter case each succeeding vessel's level being so adjusted as to cause brine to be sucked up into it to replace the water evaporated; this level must be adjusted relatively to the gravities of the brines and the degree of vacuum operating in the respective evaporator.

The feed introduced through the feed water heater 30 into the first evaporator 10 enters that evaporator in a hot condition. The temperature within the first stage calandria 15 is preferably a high temperature, in order to conduce to heat economy. The temperature in the second stage evaporator 11 is controlled at the desired point for obtaining precipitation of salts the solubility of which at near saturation point of the mother liquor diminishes as the temperature rises, and vice versa. The temperature in the final evaporator may be at any point, either higher or lower than the temperature in the intermediate evaporator, dependent upon considerations of heat economy or otherwise. The condensate from the first stage calandria 15 is utilized in the coil 32 for original feed preheating purposes. Steam serving the calandria 15 is introduced through the pipe 25 from a boiler, the rate of supply being controlled by adjustment of the valve 26. The vapors given off in the evaporator 10 suffer recompression in the pump 28 and are thence redelivered into the calandria 15 at a higher temperature than the temperature at which they came from the evaporator 10. Brine is taken from the evaporator 10 when it has reached a density below but near to the "critical" point at which calcium sulphate suffers precipitation; this transference is effected through the pipe 34 by pump or gravitation as hereinbefore described, or by pressure head. The steam introduced through the pipe 25 after the apparatus is in operation represents only the quantum of heat required to maintain the heat balance in the system, the heat difference for procuring evaporation being maintained for the most part by recompression operation of the pump 28, and, in turn, during the later stages of the operation, by the recompression operation of the pumps 38 and 46. The brine liquor which enters the second stage evaporator 11 via the pipe 34 therein suffers a second stage of evaporation, the vapors produced being recompressed in the pump 38 and thence sent by the pipe 43 into the calandria 16. The small vertical height of the calandria 16 ensures the condition that the heat applied through it to the brine liquor in the evaporator 11 is applied only in a zone of small depth. A small heat difference will be effective for maintaining an evaporative condition in this arrangment, for the reasons previously explained. If the calandria were of considerable depth the hydrostatic head of the brine at the lower portion of the calandria would be substantially greater than the hydrostatic head about the upper portions of it, with the result that it would be necessary to raise the temperature of the whole calandria to a point necessary to effect transference of heat through the bottom part of it, whereas when the calandria is of short depth a relatively low temperature only is necessary. The liquors coming over from the evaporator 10 through the pipe 34 are higher in temperature than the temperature in the evaporator 11, and consequently it may not be necessary to provide a source of additional heat in the form of steam, an adequate heat difference being maintained to procure evaporation by the recompression action of the pump 38 alone. But, to provide for additional heat, valved steam service pipes 56 and 57 are connected to the pump delivery pipes 43 and 47 respectively.

The sea water which is brought into the evaporator 10 is therein reduced to about one-third its normal volume which is below the concentration at which calcium sulphate would fall out of solution. When the volume of water is somewhat further reduced by evaporation, the calcium sulphate contained in it reaches the super-saturated condition and then precipitates. For the purpose of effecting this precipitation the vaporization obtained in the second stage evaporator 11 is carried to or beyond the point at which the brine has been concentrated sufficiently to bring about precipitation of calcium sulphate. Substantially all the calcium sulphate (or other intermediate salt) thus suffers precipitation in the second stage, and the sodium chloride and other highly soluble salts which remain in the brine in this concentrated condition are carried on to the third stage evaporator 12 through the pipe 44. In this third stage evaporator the brine is further concentrated to a point at which substantially all the sodium chloride will be precipitated. The precipitated sodium chloride is removed from the sump 24, and the bitterns, which represent the densest portion of the mother liquor in the evaporator 12, are taken off from that sump for further treatment through the siphon 55, or are sent to waste. When the third stage evaporator 12 is operated at high temperature the heat value of these bitterns may be utilized to raise the temperature of the liquid flowing up from the sump 23 to the evaporator 12.

As calcium sulphate is precipitated in the body of the liquor in the evaporator 11, and not on the heating surfaces therein these surfaces are not scaled.

Normally, the evaporating liquid taken over from the primary evaporator 10, into the second stage evaporator 11 contains a greater supply of heat than is necessary for the operation which is performed in the second stage evaporator 11, and this excess heat will be immediately represented by discharge of vapor. To remove excess heat from the system of the evaporator 11, the shunt cooling arrangement 58—61 is provided. For simplicity of explanation only one calandria has been shown on each of the three evaporators.

The apparatus shown in Fig. 3 is one in which three calandria, each contained in an independent open top pan, are disposed in tier arrangement in one evaporator chamber. The same principal as here shown may be applied with two, three or four calandria, or with any greater number of calandria within reasonable working limits, contained in the one evaporator chamber. This multiple calandria evaporator when utilized for the obtaining of salts from sea water is the second evaporator 11, Fig. 1, or may be used also as the third stage evaporators, Fig. 1. In the following description it is assumed that this multiple calandria arrangement takes the place of all evaporators in the system other than the primary evaporator 10. Consequently, the primary brine supply pipe 300 (Fig. 3) from the primary evaporation corresponds functionally with the uptake pipe 34 shown in Fig. 1. This pipe 300 is fitted with a valve 301 and it delivers the concentrated brine into the uppermost pan 302 in the tier of three pans 302, 303, 304, all of which are contained in the one evaporator chamber 305. A foot pipe depends from the bottom of each of the pans 302, 303, and 304 into a sump, the several sumps 306, 307, 308 being disposed at appropriate levels corresponding respectively with the differences in levels of the pans 302, 303 and 304 respectively. The foot pipe 309 from the pan 302 is brought out laterally through the pipes 310 and 311 which depend respectively from the pans 303 and 304, and the foot of each of these pipes respectively leads to its approriate sump 306, 307 or 308. 312 are drip flanges which collect any moisture precipitated on the chamber sides and deposit it in the pan next below.

The head 313 of the evaporator 305 is fitted with intercepting baffle plates 314, and the vapor eduction pipe 315 is led off the head 313 above the baffles 314. The recompression pump 316 takes the vapor from the eduction pipe 315 and delivers it into the trunk pipe 317, from which three pipes 318, 319, and 320 are respectively branched to the three calandria 321, 322 and 323. The condensate from each of these calandria is carried through drip pipes numbered respectively 324, 325, and 326 into sumps 327, 328 and 329, which, like the sumps 306, 307, and 308 are located at different levels corresponding with the difference in levels of the three calandria pans 302, 303, 304. All these pipes are connected to the air eduction pipe 330 which leads to the air pump 331; this pump performs the usual office of an air pump in a condenser system. The pan 303 is connected by a suction pipe 332 to the sump 306, which is the sump of the pan 302 above it, and similarly the pan 304 is connected by the suction pipe 333 with the sump 307 which is the sump of the pan 303 above it. In each of the pans 302, 303 and 304 is a float controlled lever which operates the valve in the feed pipe to that pan; these valves being respectively numbered 301, 334, and 335; the float lever control for these valves is not illustrated; its construction is commonly known to mechanics, and it is arranged to arrest the flow into the pans when the calandria in them respectively are just fully immersed. A similar float valve is fitted in the pipe circuit 300. 336 and 337 are foot valves arranged for permitting upflow of liquid only through the pipes 332 and 333. The three calandria are each of very small depth, but are otherwise appropriately constructed according to known practice to offer extensive heat transmitting surfaces.

The brine from the primary evaporation entering by the pipe 300 suffers evaporation in the pan 302. In this stage of evaporation the concentration point of one of the salts contained in the brine may be reached. If it is reached, that salt will be precipitated in the foot pipe 309 and will pass to the sump 306 from which it may be collected; otherwise the precipitation takes place at a later stage of concentration in one or more of the pans below. The pan 303 is charged by liquor drawn from the sump 306 through the suction pipe 332 obediently to the difference in levels and the atmospheric depression in the evaporator 305. In this pan a further quantity of vapor is removed, and the salt or salts precipitated (if any) pass down by the foot pipe 310 to the sump 307. Similarly, in order, the pan 304 takes its brine from the sump 307 and delivers the salts precipitated in it into the sump 308. The salts respectively collected in the sumps 307 and 308 are subsequently removed from those sumps. This apparatus is effective for the fractional precipitation of a variety of salts from a brine in which they are contained together. By multiplication of the number of calandria a degree of sub-division of the precipitates may be attained which ensures fractional separation and so enables the obtaining of pure grades of precipitate.

The prior description may be extended generally to apply to the modified type of multiple calandria construction shown in Figs. 4 and 5. This is the preferred form of that construction. In this case also a plurality of calandria is contained in one or more of the evaporator chambers; these calandria are arranged in tier with their respective pans pipe-connected to circulating pumps which pass the concentrated liquors together with suspended salts into precipitating vessels.

Referring to the drawings, Figs. 4 and 5,— 601 is the recompression pump which delivers the recompressed vapors into a trunk pipe 602, which is branched at 603, 604, 605 and 606 into four calandria numbered respectively 607, 608, 609, and 610. The respective circulating pumps are numbered respectively, 611, 612, 613, 614, and their related precipitating chambers are numbered 615, 616, 617, and 618.

The drains 619, 620, 621, and 622 respectively from the four calandria are brought down to sumps which are disposed as in the previous case at corresponding levels with the salt precipitation sumps into which the foot pipes of the several precipitating vessels 615, 616, 617, and 618 are carried.

Whilst, in the first place, thermal efficiency is augmented by the using of calandria of small depth, there is in the second place a further thermal advantage, with a saving in capital cost of plant, which results from the using of several such calandria in tier in each evaporator chamber which is operated under partial vacuum. This multiplication of the calandria without multiplication of evaporators is made practicable by the using of shallow calandria. In the result a certain augmentation of capacity is attained without corresponding increase in evaporator dimensions.

What we claim as our invention and desire to secure by Letters Patent is:—

1. A process for the extraction of salts from sea water which consists in conducting the evaporation at high temperature until a concentration point is reached below that at which calcium sulphate is precipitated, transferring the concentrated brine to another closed chamber having the temperature of its heating surfaces maintained at about 38° C. and under vacuum sufficent to procure rapid evaporation at that temperature, thereby to procure the precipitation of the calcium sulphate as a mud, then transferring the strong brine to another evaporator and continuing evaporation therein for the precipitation of sodium chloride, and finally removing the residual liquor containing the bitterns.

2. A process for extracting salts from solutions, which consists in first concentrating a solution of salts to remove the bulk of the water in excess of that required to dissolve the least soluble of the salts in solution, then continuing the evaporation in a heated evaporator chamber under vacuum at a temperature below that at which any of such salts are precipitated on heating surfaces as scale in order thereby to effect precipitation of such scaling salts in the body of the liquid and not on the heater surfaces, and thereafter continuing the evaporation to procure the precipitation of other salts which on suffering precipitation do not attach themselves to the heater surfaces as scale.

3. A process for the extraction of salts from sea water which consists in conducting the evaporation at high temperature until a concentration point is reached below that at which calcium sulphate is precipitated, transferring the concentrated brine to another evaporator and continuing the evaporation under vacuum therein below a critical temperature which is about 38° C. or slightly higher, to procure the precipitation of the calcium sulphate as a mud, then transferring the strong brine to another evaporator, continuing evaporation therein for the precipitation of sodium chloride, and finally removing the residual liquor containing the bitterns.

In testimony whereof we affix our signatures.

ANDRIANNE ZALOCOSTAS,
JOHN VELISSAROPULOS,
*Executrix and Executor, respectively, of Demetrius George Zalocostas, deceased.*